Figures 1, 2:
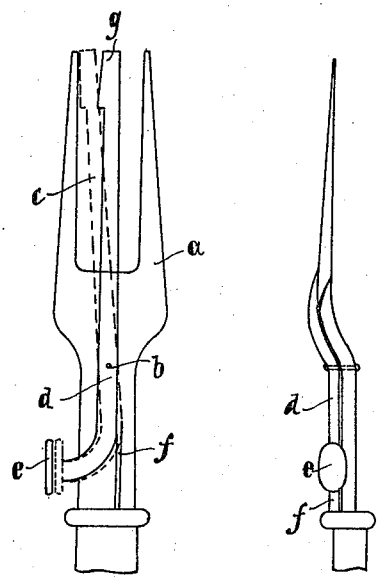

W. SCHLOEMILCH.
FORK WITH MOVABLE SUPPLEMENTARY PRONG.
APPLICATION FILED DEC. 2, 1910.

1,062,189.

Patented May 20, 1913.

Witnesses:

Inventor:

UNITED STATES PATENT OFFICE.

WILHELM SCHLOEMILCH, OF BERLIN, GERMANY.

FORK WITH MOVABLE SUPPLEMENTARY PRONG.

1,062,189.   Specification of Letters Patent.   Patented May 20, 1913.

Application filed December 2, 1910. Serial No. 595,251.

*To all whom it may concern:*

Be it known that I, WILHELM SCHLOEMILCH, a subject of the Emperor of Germany, residing at Berlin, in the Kingdom of Prussia, German Empire, have invented certain new and useful Improvements in Forks with Movable Supplementary Prongs; and I do hereby declare the following to be a full, clear, and exact description of the invention, such as will enable others skilled in the art to which it appertains to make and use the same.

The present invention relates to a fork with movable supplementary prong, which is chiefly intended for gripping fish-bones, but may also be used for removing small pieces of bone or the like from the meat of fowl.

In the accompanying drawing the present invention is exemplified in five different modifications.

Figure 1 is a front view of the first modification. Fig. 2 is a side view of the first modification.

To the fork $a$ is fitted the supplementary prong consisting of a double armed lever $c, d$ fulcrumed at $b$. The lever arm $d$ is provided with a knob $e$, and is held in position by a spring $f$. The lever arm $c$ may be provided with a small shoulder $g$ at its upper end, which will, on the lever arm $d$ being moved into the position shown by the dotted lines lie parallel against one of the stationary prongs of the fork, whereby it is possible, to safely grip the fish-bones.

I claim:

The combination of a fork with a supplementary movable prong adapted to coöperate with one of the prongs of the fork and grip fish-bones and the like, the said supplementary prong fulcrumed to the fork furnished with a bend whereby it extends into the plane of the other prongs movable in the plane of the other prongs and coöperating with one of the prongs.

In testimony whereof I affix my signature in presence of two witnesses.

WILHELM SCHLOEMILCH.

Witnesses:
BOHMUIL TIROSKO,
HUGH GRAMATSKI.

Copies of this patent may be obtained for five cents each, by addressing the "Commissioner of Patents, Washington, D. C."